July 10, 1951  J. C. KALBACH  2,559,631
STAGEWISE FLUIDIZING REDUCTION OF ZINC COMPOUNDS
Filed Aug. 8, 1947  2 Sheets-Sheet 1
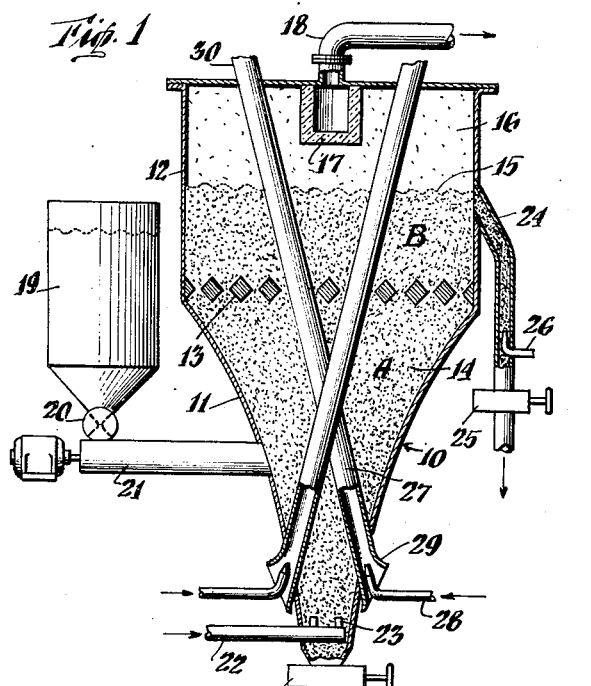
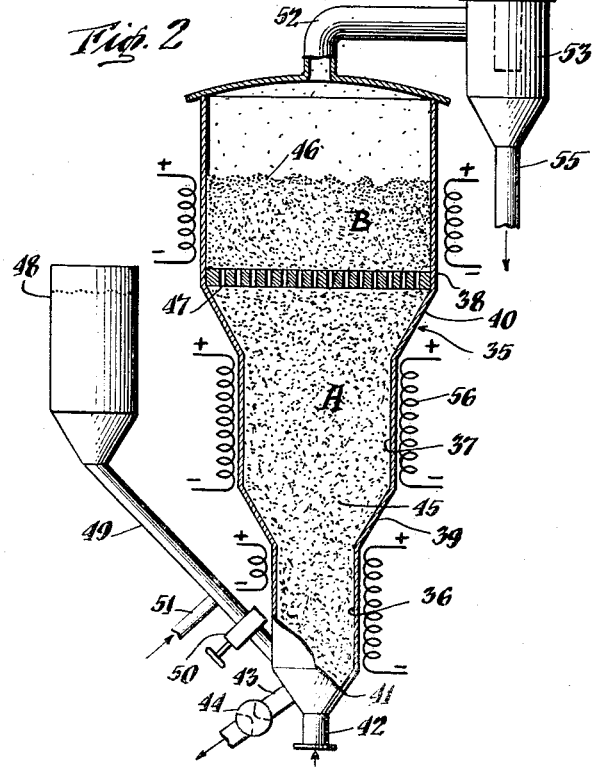
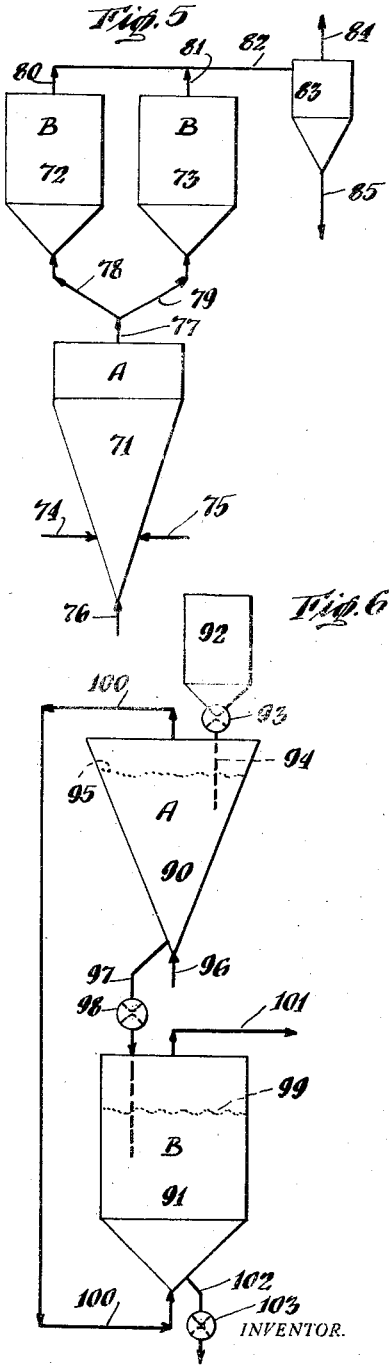
INVENTOR.
John C. Kalbach
BY Paul W. Garbo
ATTORNEY July 10, 1951 J. C. KALBACH 2,559,631
STAGEWISE FLUIDIZING REDUCTION OF ZINC COMPOUNDS
Filed Aug. 8, 1947 2 Sheets—Sheet 2
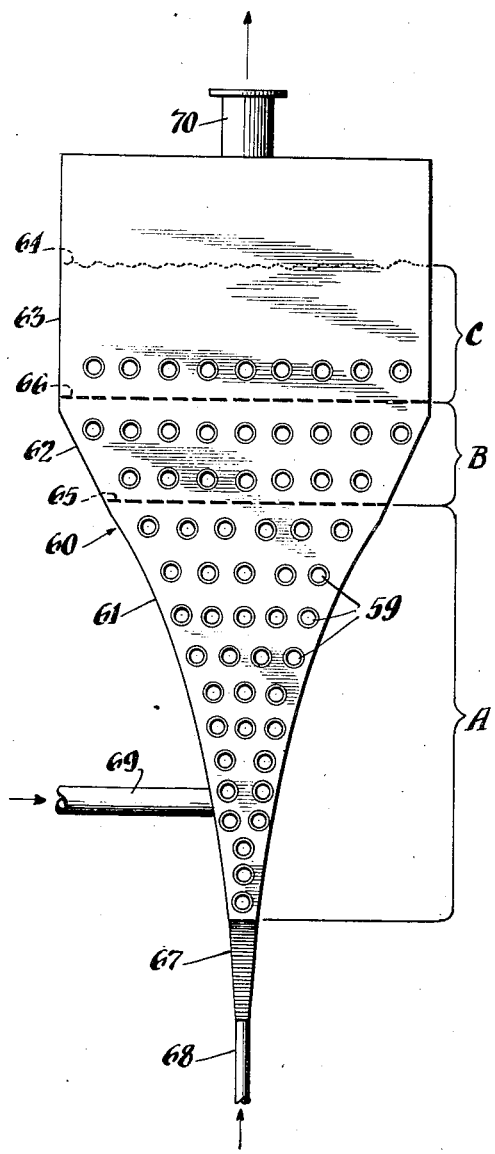
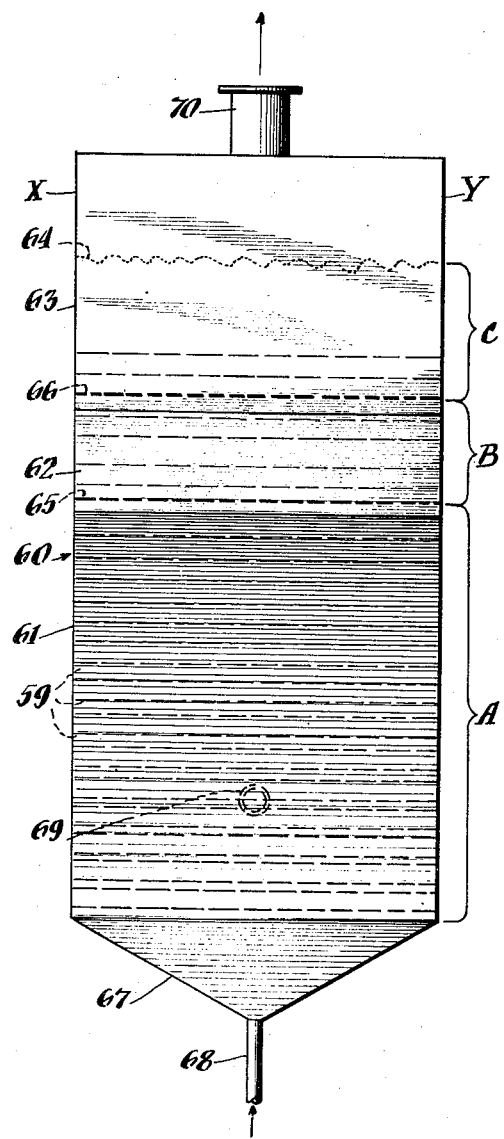
INVENTOR.
John C. Kalbach
BY Paul W. Garbo
ATTORNEY Patented July 10, 1951

2,559,631

UNITED STATES PATENT OFFICE 2,559,631

STAGEWISE FLUIDIZING REDUCTION OF ZINC COMPOUNDS

John C. Kalbach, New York, N. Y., assignor to The American Metal Company Limited, New York, N. Y., a corporation of New York Application August 8, 1947, Serial No. 767,548

11 Claims. (Cl. 75—26)

This application is a continuation-in-part of the copending application Serial No. 759,545, filed July 8, 1947, and now Patent No. 2,485,604 of October 25, 1949, wherein I have disclosed a process for producing zinc by reducing comminuted zinc compounds, such as the oxide and the silicate of zinc, under fluidizing conditions and in a manner such that the gaseous effluent from the reducing zone is rich in zinc vapor.

The present invention is in the nature of an improvement of the process of copending application Serial No. 759,545.

One of the primary objects of this invention is to conduct the fluidized reduction of zinc compounds in reducing apparatus of decreased size.

Another important object is to facilitate the recovery of zinc more nearly completely from the gangue or residue of reduction.

A related object is to provide a commercially feasible process for producing zinc from ores, concentrates and like raw materials which are so lean in zinc content that they are not utilized in the operation of conventional processes.

Still another object is to carry out at least part of the reduction at lower temperatures than would otherwise be practical with the result that economies in equipment cost, maintenance and heat losses are realized.

Further objects of my invention will become evident in the description which follows.

For the purposes of this invention, the term, zinc compound, embraces the oxide, hydroxide, silicate and carbonate of zinc since these zinc compounds are readily reduced to metallic zinc. Generally, however, the oxide form of zinc is charged to the reducing zone. The most prevalent type of mineral or ore contains zinc as a sulfide which is roasted to the oxide form prior to reduction for the recovery of metallic zinc. Typical of sulfide type ores is sphalerite, the sulfide of zinc. A lower grade ore or mineral is marmatite, a double sulfide of zinc and iron, which when found substantially free of richer zinc minerals is considered too lean in zinc for economic working by conventional processes of reduction. After roasting, these ores contain not only the oxides of zinc and iron but other natural occurring contaminants. The process of the present invention is well suited for the reduction of zinc compounds having such impurities associated therewith. It is understood that the minerals or ores which are to be treated for the recovery of zinc are usually concentrated by jigging, flotation, etc., but these ore concentrates in general still have an appreciable content of impurities.

Copending application Serial No. 759,545 sets forth in detail the advantages of conducting the fluidized reduction of a comminuted zinc compound in a bed of increasing horizontal cross-section, the smallest cross-section being at the bottom of the bed. The use of a tall, flared fluidizing zone or chamber to hold the bed of increasing horizontal cross-section makes it possible to introduce such small quantities of gas as the fluidizing medium that the gaseous stream leaving the chamber is rich in zinc vapor. Furthermore, an upwardly flared reduction zone permits the maintenance of a substantially uniform gas velocity therethrough in spite of the exponential increase of the volume of gas with the evolution of zinc vapor and carbon oxides in the reduction of the zinc compound.

In accordance with this invention I have found that additional benefits accrue when the fluidized reduction of a zinc compound is carried out in at least two stages, provided that the zinc compound is charged to the first stage, and the partially reduced compound and the gaseous products of reduction flow concurrently to the second and any subsequent stage. To permit the withdrawal of a gaseous effluent rich in zinc vapor from the last stage of reduction, the first stage is made the smallest in horizontal cross-section; preferably, the first stage is of increasing horizontal cross-section in the direction of the gaseous flow therethrough. While the subsequent stages of reduction are as large or larger in horizontal cross-section than the uppermost horizontal cross-section of the first stage, in general they necessitate relatively slight upward flaring of the fluidized mass which they hold and often they are substantially uniform in horizontal cross-section. For example, a two-stage reducer may have a first stage wherein the horizontal cross-section increases 16-fold from bottom to top and the second stage has an invariant horizontal cross-section equal to the uppermost section of the first stage. In another illustration, a three-stage reducing operation may involve a first stage with a 14-fold increase in horizontal cross-section in the upward direction, a second stage of relatively slight upward flaring such that the overall increase in horizontal cross-section from the bottom of the first stage to the top of the second stage is about 17-fold, and a third stage of the same horizontal cross-section as the uppermost section of the second stage.

The importance of providing a flared fluidizing zone or chamber for at least the first stage of the reduction is readily appreciated from a consideration of the principal phenomena taking place during the reduction.

Thus, for instance, if zinc oxide is reduced with gaseous carbon monoxide in the presence of solid carbon, the chemical reactions which take place may be represented by the following equations:

(A)  $ZnO + CO \rightarrow Zn + CO_2$ (B)  $CO_2 + C \rightarrow 2CO$ It is clear from these equations that (1) the reactions generate substantial volumes of gases and (2) carbon monoxide is continuously being consumed and reformed in cyclic fashion. In connection with the latter point, it is well to observe that in spite of the cyclic consumption and regeneration of carbon monoxide, the volume of carbon monoxide passing through the reducing zone increases steadily and exponentially during said passage, if the vessel is so shaped as to maintain a constant gas velocity throughout. There is some evidence to believe that the reduction takes place by direct reaction between the solids as follows:

(C) $\quad ZnO + C \rightarrow Zn + CO$

If this reaction mechanism accounts for part or all of the reduction, the same exponential increase in the volume of carbon monoxide and zinc vapor occurs; it will be noted that Equation C corresponds to the sum of Equations A and B.

It will be clear from the foregoing discussion of the reducing reactions that, inasmuch as the zinc compound to be reduced is charged to the first reduction stage and is made to flow to subsequent stages concurrently with the reaction gases, the propensity for the evolution of zinc vapor and carbon oxides is greatest in the first stage wherein the concentration of unreduced zinc compound is greatest. Accordingly, the concept of an upwardly flared fluidizing zone to permit the maintenance of a substantially uniform gas velocity finds more important application in the first stage rather than any subsequent stage of a stagewise process for the reduction of zinc compounds.

As used in this specification and the appended claims, the term, stage, means a division of the reducing operation or the apparatus in which reduction is performed, there being two or more such divisions in series arranged for the concurrent progress or movement of reaction solids and gases therethrough. It will be understood that any stage of reduction may be carried out in a portion of a reducer, a separate reducer or a plurality of vessels interconnected to function effectively as a single reducer. A plurality of vessels will function as a single zone or vessel when they are arranged in parallel and have equal hold-up times.

I have found that in general the reduction of zinc compounds may be satisfactorily performed in two or three stages depending upon the particular material containing the zinc compound and the reaction conditions to be employed in the reduction process. Whether two, three or more stages are chosen for a given operation, it is advantageous that each stage be made to hold approximately the same volume of fluidized solids. Another criterion for proportioning and regulating the several stages of the reduction is the conversion or percentage of reaction effected with the solids entering each stage; preferably, this conversion is made approximately constant for all the stages of any reducing operation. For instance, if it is desired to recover about 98.5% of the available zinc in a roasted ore of the zinc sulfide type in a three-stage reduction, optimum staging is attained when a conversion of about 75% is effected in each stage, i. e., the first stage reduces about 75% of the zinc content of the charged material, the second stage then reduces about 75% of the residual zinc content (25% of that originally available) and the third stage reduces about 75% of the available zinc in the solids passing from the second to the third stage. Thus, of the available zinc in the roasted ore, 75% is reduced in the first stage, 19% in the second and 4.5% in the third, giving an overall recovery of 98.5% for the three-stage process.

For the first stage of reduction, I prefer to maintain the fluidized solids as a deep bed of upwardly increasing horizontal cross-section because I am then able to use such small quantities of gas as the fluidizing medium that the zinc vapor in the gases discharged by the process approaches closely the concentration it would have according to theory, i. e., 50% by volume concentration based on the pure zinc oxide equivalent content of the material charged to the reducer. However, it is to be remembered that roasted or calcined ores and other forms of zinc compound frequently contain reducible compounds of iron and other metals which naturally decrease that concentration of zinc vapor in the gases leaving the reducing zone which is theoretically obtainable with the reduction of the pure zinc compound. In any event, through the use of a tall, flared reducer and the injection thereinto of a relatively minute quantity of gas to support fluidization, the gaseous effluent contains not less than 40% by volume, and preferably not less than 45% by volume, of zinc vapor, based on only the injected fluidizing gas and the reaction gases deriving from the pure zinc oxide equivalent content of the material entering the reducing zone.

By referring the concentration of zinc vapor in the gaseous effluent to the pure zinc oxide equivalent content of the material charged to the reducing zone, a common basis is provided for evaluating the effectiveness of the process of the invention with all sorts of materials that are suitable for reduction. To begin with, there are the pure zinc compounds, hereinbefore referred to:

| Name | Formula | ZnO Equivalent |
| --- | --- | --- |
| zinc oxide | ZnO | ZnO |
| zinc hydroxide | Zn(OH)$_2$ | ZnO.H$_2$O |
| zinc carbonate | ZnCO$_3$ | ZnO.CO$_2$ |
| zinc silicate | ZnSiO$_3$ | ZnO.SiO$_2$ |

The above table shows that the hydroxide, carbonate and silicate of zinc have one equivalent content of zinc oxide. The hydroxide and carbonate of zinc will during reduction release water vapor and carbon dioxide, respectively, and will thus naturally decrease the concentration of zinc vapor in the gases leaving the reducer. Because the water vapor and carbon dioxide react with the solid reducing agent to produce a larger volume of gas (hydrogen and carbon monoxide) which further dilutes the zinc vapor, it is generally advisable to calcine the hydroxide and carbonate of zinc to eliminate the water and carbon dioxide, respectively, as a pretreatment step prior to reduction. Since the silica (SiO$_2$) of zinc silicate is not volatilized like the water and carbon dioxide of the hydroxide and carbonate, there is no reason for first calcining zinc silicate other than to drive off physically associated moisture. Furthermore, as already mentioned, the zinc compounds are generally found in nature associated with impurities. When these impurities, for instance, the oxides of iron and lead, are reduced under the conditions selected for the reduction of the zinc compound, the gases leaving the reducing vessel will contain carbon monoxide resulting from the reduction of the impurities as well as the carbon monoxide resulting from the reduction of the zinc compound. Accordingly, reducible impurities associated with the zinc compound fed to the reducer cause a diminution of that concentration of zinc vapor in the effluent gases which is theoretically obtainable with the reduction of the pure zinc compound.

For the preferred embodiment of my stagewise reduction process involving a first stage of increasing horizontal cross-section, it is advisable to operate in the first stage with a fluidized mass of at least 5 foot depth; preferably, the depth is of the order of 10 to 40 feet.

The rate of increase of gas volume, and hence horizontal cross-section of vessel, with depth of bed depends upon the reactivity of the zinc compound and solid reducing agent used, the gas velocity maintained, the temperature of operation and the recovery of zinc metal which is regarded as satisfactory for each stage (since the fluidized mass of each stage is of residue composition for that stage). This rate of increase may be conveniently expressed as the "gas doubling height," that is to say, that height of bed within which the volume of gas passing therethrough is doubled. In practice, the gas doubling height may vary from about 1 to 20 feet but preferably falls in the range of about 3 to 12 feet.

It will be appreciated that the overall depth of bed in the several stages of a given reduction process and the gas doubling height must in each case be correlated so that the gases discharged by the process contain the zinc vapor in the high concentration stipulated hereinabove.

Another useful guide in properly correlating the overall bed depth for a stagewise operation and the gas doubling height is to provide such a total bed depth that the gaseous effluent from the last stage is at least 8 times, and preferably at least 12 times, the volume of the fluidizing medium charged at the bottom of the first stage.

The comminuted zinc compound, notably impure zinc oxide obtained by roasting a sulfide type of zinc ore, is generally supplied to the reducing zone in the form of particles all of which pass through a 60-mesh screen and 20% to 40% of which pass through a 325-mesh screen. The carbon or solid reducing agent, such as coal, charcoal or coke, is usually supplied to the reducer in the form of particles somewhat coarser than the zinc compound particles because of the lower specific density of carbon and consequent tendency of these carbon particles to become fluidized at a gas velocity which will fluidize the finer but denser particles of zinc compound. The average gas velocity through the reducing zone will usually be in the range of about 0.2 to 2.0 feet per second, preferably about 0.4 to 1.5 feet per second. However, all of the foregoing factors may have values larger or smaller than the indicated advantageous ranges, as will be obvious to those skilled in the art.

Satisfactory temperatures for reducing zinc compounds by the process of this invention fall in the range of 1600° to 2300° F., preferably in the range of 1750° to 1950° F.

To facilitate understanding of the invention, reference is now had to the drawings accompanying this specification and forming a part thereof, of which:

Figure 1 is a schematic sectional elevation of one form of reducing apparatus in which a two-stage reduction may be carried out;

Figure 2 is a similar view of another form of a two-stage reactor suitable for the process of this invention;

Figure 3 is an elevation of a three-stage reducer;

Figure 4 is a side view of the apparatus shown in Figure 3;

Figure 5 is a diagrammatic representation of a plurality of vessels arranged in a manner to permit the conduct of a two-stage reduction in accordance with the principles of this invention; and Figure 6 is a diagrammatic showing of another arrangement of equipment for a two-stage reducing operation.

Referring to Figure 1, a reducing vessel 10 is provided with a lower flared section 11 and an upper straight section 12 communicating with lower section 11 through the openings in a grill 13. The fluidized mass 14 disposed in the contiguous sections 11 and 12 has an upper pseudo-liquid level 15 defining the region where the reaction gases emerge from the fluidized mass and flow through space 16 wherein the bulk of entrained particles tend to become disengaged from the reaction gases. The filter element 17 serves to eliminate residual particles from the gases leaving the reducer 10 by way of outlet 18. In effect, the grill 13 divides the fluidized mass 14 into a lower portion A wherein the first stage of reduction is carried out and an upper portion B wherein the second stage of the reduction is performed. A feed hopper 19 with a rotary bucket-type valve 20 serves to introduce a comminuted mixture of zinc compound and carbon to the first reducing section or stage 11 by way of screw conveyor 21. At the lower end of section 11 an inlet pipe 22 provided with nozzles 23 is used for the introduction of a relatively small quantity of a fluidizing gas such as carbon monoxide, carbon dioxide or nitrogen.

Because of the restricted openings in grill 13, the fluidized solids in flared section 11 move into the contiguous section 12 with little or no tendency of the solids in section 12 to flow back into section 11. The reacted solids are withdrawn from section 12 or the second stage of the reducer through draw-off pipe 24. A slide valve 25 is used to control this withdrawal and tube 26 above valve 25 is used to introduce a small quantity of gas such as carbon monoxide to ensure the free flow of solids discharging through pipe 24.

The reducer 10 has a plurality of fire-tubes 27 set obliquely through the fluidized mass in sections 11 and 12 to supply the heat required for the reduction of the zinc compound. A fluid fuel such as natural gas or fuel oil is charged through injectors 28 which cooperate with Venturi-like openings 29 for the aspiration of air to support combustion within the tubes 27. The combustion or flue gases leave these tubes through the upper ends 30, discharging into the atmosphere or a suitable stack.

The lower end of reducing vessel 10 has a slide valve 31 which may be used to withdraw the solids from the vessel to permit cleaning or repairing of the apparatus. Valve 31 may also be used during the operation of the reducing vessel for the periodic or continuous withdrawal of such coarse particles which may accidentally enter section 11 or be formed therein by agglomeration that they settle out of the fluidized mass and accumulate at the bottom of vessel 10. By withdrawing these coarse particles which drop to the bottom of the vessel, their accumulation to the point at which fluidization within section 11 would be impaired is thus avoided.

In Figure 2, the reducer 35 comprises a plurality of cylindrical sections 36, 37 and 38 of increasing diameters connected by frusto-conical sections 39 and 40. The lowermost cylindrical section 38 terminates in a tapered section 41 connecting with inlet pipe 42 for the introduction of a small stream of fluidizing gas. Attached to the tapered section 41 is a draw-off pipe 43 having valve 44 for the withdrawal of solids as hereinbefore discussed in connection with valve 31 of Figure 1. The fluidized mass 45 having an upper pseudo-liquid level 46 is divided by perforated plate 47 into a lower portion A to serve as the first stage of the reduction and an upper portion B for the second stage of the reduction. The perforations in plate 47 permit the flow of reaction gases and fluidized solids to pass from the first stage to the second stage of reducer 35 and prevent the solids in the second stage or portion B of the fluidized mass from dropping back into the first stage or portion A of the fluidized mass. Accordingly, the reaction gases and fluidized solids move concurrently from the first stage to the second stage of the reducer 35. Hopper 48 is used for charging a mixture of finely-divided zinc compound and carbon or like reducing agent into the first stage of the reducer 35. Hopper 48 discharges into portion A of the fluidized mass through standpipe 49 and slide valve 50. A connection 51 is used to introduce a small quantity of gas, say carbon monoxide or air, to keep the solids in line 49 in a free-flowing condition. The reacted solids are conveyed by entrainment in the reaction gases leaving reducer 35 by way of outlet pipe 52. The reaction gases and suspended particles enter cyclone separator 53 wherein the gases and solids are separated, the gases leaving by way of outlet 54 and the solids flowing out of standpipe 55. The reaction gases emerging from outlet 54 pass to suitable condensers or equivalent means for separating the zinc vapor from the remainder of the gaseous effluent issuing from outlet 54. In this instance, the necessary heat for the reduction of the zinc compound is furnished by electrical resistance heaters 56.

Figures 3 and 4 show a three-stage reducer 60 comprising a lowermost flared section 61, an intermediate tapered section 62 and an uppermost straight section 63. The fluidized mass which fills reducer 60 to the pseudo-liquid level 64 is divided into portions A, B and C by grills 65 and 66. An adapter section 67 is connected to the bottom of flared section 61 to spread uniformly the fluidizing gas introduced through line 68 throughout the horizontal cross-section of section 61. A mixture of zinc compound and a reducing agent in powdered form is introduced through line 69 into portion A of the fluidized mass. The partially reduced solids and reaction gases progress from portion A or the first stage of the reducer through grill 65 into portion B or the second stage of the reducer, and thence through grill 66 into portion C or the third stage of the reducer. The gaseous effluent of reducer 60 discharges through outlet 70. Reacted solids may be withdrawn from portion C of the fluidized mass either by entrainment in the reaction gases leaving through outlet 70 or through a draw-off pipe (not shown) connected to the side of section 63 below the pseudo-liquid level 64. The gaseous effluent from reducer 60 may pass through filters, electrical precipitators or like separators for the removal of entrained particles and flow through condensers for recovering the contained zinc vapor. Reducer 60 is provided with a plurality of horizontal tubes 59 passing through the fluidized mass and welded or otherwise fastened to opposite faces X and Y of reducer 60 in the manner of boiler tubes fastened to header plates. The tubes 59 are open at both ends and therefore permit the passage of hot combustion gases therethrough for heating the fluidized mass within reducer 60. Advantageously, this form of apparatus is placed within a furnace setting wherein the combustion gases from the fire-box impinge on one face, say X, of reducer 60 in the several tubes 59 and discharge therefrom along the opposite face, say Y, of the reducing vessel. Alternatively, individual burners may be set at one end of each tube 59 and the combustion gases withdrawn at the opposite end. Inasmuch as each succeeding stage of a stagewise reducing operation accounts for a diminishing quantity of reaction the number of heating tubes 59 in portions A, B and C of the fluidized mass is progressively smaller.

Figure 5 shows an arrangement of three vessels 71, 72 and 73 wherein the fluidized mass is maintained in two portions A and B. The portion A in tapered vessel 71 acts as the first stage of the reducing equipment and communicates through line 77 and branches 78 and 79 with portion B disposed in cylindrical vessels 72 and 73. Because of the relatively high velocity of the gases passing through lines 77, 78 and 79, the solids can only move from portion A to portion B of the fluidized mass. Line 74 is used for introducing a finely-divided zinc compound and line 75 serves for the introduction of comminuted coke or like reducing agent. A relatively small quantity of fluidizing gas such as carbon monoxide enters vessel 71 through line 76. The reaction gases and reacted solids suspended therein pass from vessels 72 and 73 through lines 80 and 81, respectively, to the manifold line 82 which in turn discharges into separator 83. The reaction gases including zinc vapor leave separator 83 through line 84 and the reacted solids or residue of the two-stage reduction operation flow out of line 85. It will be observed that vessels 72 and 73, which are arranged in parallel, function together as a single vessel of larger diameter that might be used for the second stage of the reducing process.

Figure 6 presents an arrangement of reducing equipment comprising a tapered vessel 90 and a cylindrical vessel 91. Vessel 90 holds portion A of the fluidized mass in which the first stage of reduction is effected and vessel 91 holds portion B of the fluidized mass for the second stage of the reduction. A mixture of zinc compound and solid reducing agent in powdered form flows from hopper 92 through rotary-type valve 93 into standpipe 94 discharging below the pseudo-liquid level 95 of portion A of the fluidized mass. A limited quantity of fluidizing gas is introduced into the bottom of tapered vessel 90 by way of line 96. The reaction gases from the first stage of reduction pass through line 100 into vessel 91 wherein the second stage of the reduction is carried out. The partially reacted solids flow from vessel 90 through standpipe 97, controlled by a valve 98, and discharge below the pseudo-liquid level 99 of portion B of the fluidized mass within vessel 91. The reacted solids leave the second stage of the reducing equipment through line 102 and control valve 103. The arrangement of reducing equipment shown in Figure 6 is advantageously used where the zinc compound to be reduced is in the form of a material which tends to agglomerate during reduction. In such a case, the agglomerates will readily pass with the fluidized mass from vessel 90 or the first stage of reduction to vessel 91 or the second stage of the reduction and the residue of the operation can be easily withdrawn through line 102 at the bottom of vessel 91.

Since Figures 5 and 6 are diagrammatic representations of reducing equipment suitable for the practice of my invention, means, such as fire-tubes, electric arcs or resistance heaters, to provide heat for the endothermic reducing reaction have not been shown.

A specific example of a two-stage reduction process conducted in accordance with this invention will be given in terms of a reactor of the type shown in Figure 1. The vessel 10 is 2.3 feet in diameter at the point where carbon monoxide is fed through line 22 and is 9.0 feet in diameter above the grill 13. Portion A of the fluidized mass is 22.2 feet in depth and portion B is 8.2 feet in depth. Fifty fire-tubes 27 of 4-inch diameter are uniformly spaced around the axis of vessel 10 in a four-ring arrangement. Natural gas is burned with air within tubes 27 to maintain both portions A and B of the fluidized mass 14 at a reaction temperature of 1840° F. A mixture of impure zinc oxide (weight analysis of ZnO 78.5%, ZnS 1.5%, $ZnSO_4$ 2.2%, $Fe_2O_3$ 10.0%, PbO 2.8% and the remainder comprising the oxides of copper, cadmium, manganese, magnesium, calcium and silicon) and coke in the proportions of 2 lbs. of impure zinc oxide per lb. of coke and in the form of a powder passing through a 60-mesh screen (40% thereof passing through a 325-mesh screen) enters the first reducing stage or portion A of the fluidized mass 14 by way of screw conveyor 21 at the rate of 4680 lbs. per hour. Under the selected reaction conditions and with the increase of horizontal cross-section in vessel 10 an average gas velocity of about 0.5 foot per second is established with the introduction of 1610 cubic feet (standard conditions) per hour of carbon monoxide through pipe 22. The reaction gases and solids move from the first stage through grill 13 to the second reducing stage or portion B of the fluidized mass 14. The total reaction gases discharge from pipe 18 with a zinc vapor content of 42% by volume (46.7% by volume of zinc vapor, based on only the reaction gases derived from the pure zinc oxide equivalent content of the material charged to the reactor and the gas supplied by pipe 22); the zinc vapor is recovered by conventional condensation, the recovery amounting to 2000 lbs. of zinc per hour or to 99% of the zinc in the impure oxide fed to the reducer. Spent or reacted solids are discharged from the second stage of the reducer through draw-off pipe 24 at the rate of 1552 lbs. per hour. Through the combination of the foregoing factors, the mass 14 is maintained in a uniformly well fluidized state ensuring the facile flow of heat from tubes 27 to all parts of the reacting mass 14 and the effluent gases are rich in zinc vapor thus facilitating the separation of zinc from the uncondensible gases, predominantly carbon monoxide.

If in the foregoing example the reduction were carried out in a single stage by removing grill 13 in vessel 10, only about 96% of the zinc in the material charged to the vessel would be recovered instead of 99% as achieved by the process of this invention. To effect 99% recovery with a single stage, the straight section 12 of vessel 10 would have to be extended upwardly so as to permit the maintenance in vessel 10 of a fluidized bed of approximately 200 feet in depth.

Another specific example of the invention will be given in terms of a three-stage reactor of the type shown in Figures 3 and 4. Vessel 60 holds a fluidized bed having an overall depth of 37.3 feet, portion A being 24.2 feet, portion B 5.7 feet and portion C 7.4 feet. Portion A of the fluidized bed flares upwardly from a bottom width of 4½ inches to a top width of 5.3 feet, portion B tapers upwardly from a bottom width of 5.3 feet to a top width of 6.4 feet, and portion C has a uniform width of 6.4 feet. The distance between faces X and Y of vessel 60 is 5.3 feet. The fire-tubes 59 of about 4-inch diameter are distributed as follows: 65 tubes in portion A, 25 in B and 8 in C. A reaction temperature of 1840° F. is maintained throughout the fluidized mass. A gas velocity of between 0.9 to 1.0 foot per second is maintained throughout the fluidized mass by the introduction of 1610 cubic feet (standard conditions) of carbon monoxide through pipe 68. The mixture of impure zinc oxide and coke used in the preceding example enters portion A of the fluidized mass by way of pipe 69 at the rate of 4680 lbs. per hour. The reaction gases and solids move successively through grills 65 and 66 and, as in the previous example, discharge from pipe 70 and, as in the previous example, the gaseous effluent leaving by way of pipe 70 has a zinc vapor content of 42% by volume (46.7% by volume of zinc vapor, based on only the reaction gases derived from the pure oxide equivalent content of the material charged to the reactor and the gas supplied by pipe 68). The zinc vapor is recovered by conventional condensation from the gaseous effluent at the rate of 2000 lbs. per hour. The reacted solids are carried out of vessel 60 by entrainment in the gaseous effluent leaving through outlet 70. These solids are separated from the gaseous stream prior to the condensation of the zinc vapor; the separation yields 1552 lbs. per hour of solids.

Comparing the two-stage and the three-stage examples of the invention set forth hereinabove, it is noted that both examples involve 99% zinc recovery but that the productive capacity per unit of horizontal cross-section of the fluidized bed is approximately twice as great in the three-stage operation as it is in the two-stage operation. If the grills 65 and 66 were removed from the three-stage reactor 60 described in the last example, the straight section 63 would have to be extended upwardly so as to permit the establishment in vessel 60 of a fluidized bed of the order of 400 feet in depth and the attainment of a 99% zinc recovery in the absence of staging.

It is contemplated that under certain circumstances it may be advisable to maintain different gas velocities and/or different temperatures in the succeeding stages of the reduction. Thus, it may be advisable to use a comparatively low gas velocity, say 0.5 foot per second, through the first stage in order to permit the zinc concentration to build up in the gaseous product stream but to have the gas velocity in the succeeding stage higher, say 1 foot per second, in order to obtain maximum capacity per unit of horizontal cross-section. Where the feed material containing the zinc compound which is to be reduced is in a poorly reactive form, it will often be beneficial to maintain a higher reducing temperature in the last stage than that in the first stage of the reduction. On the other hand, where the material containing the zinc compound is of the type which has appreciable agglomerating tendencies, it is more desirable to operate the last stage of the reducing process at a lower temperature than that of the first stage because the agglomerating tendencies generally increase as the zinc content of the material decreases.

As is known, one of the liquid-like properties of a fluidized mass or bed is its fluidstatic pressure corresponding to a liquid's hydrostatic pressure. It will therefore be appreciated that the gases and vapors ascending through a fluidized bed are exposed to a diminishing fluidstatic pressure (the product of the depth and density of the fluidized bed). The varying pressure alters somewhat the exponential increase in the gaseous volume hereinbefore described as occurring during the reduction of zinc oxide. In most cases that will be encountered in practice, deviations from truly exponential volume increases, attributable to such varying pressures, will be less than about 20%. If desired, the flare of the reducing vessel may be designed to compensate for deviations from a truly exponential increase of the gas volume.

Hereinbefore, I have stated that grill 13 of Figure 1 and perforated plate 47 of Figure 2 function to divide the fluidized mass into contiguous and connected stages whereby the gases and solids flow substantially unidirectionally from the lower to the upper stage. In general, grills, perforated plates and like stage-forming means, such as line 77 with branches 78 and 79 connecting vessel 71 with vessels 72 and 73 of Figure 5, should constrict the horizontal cross-section of the fluidized mass which is divided into contiguous stages at least about 75%, preferably at least about 85%. In other words, the openings or passages between the stages should total not more than 25%, preferably not more than 15%, of the horizontal cross-section of the fluidized mass to insure that the solids move from one stage to a succeeding stage with little or no back-flowing of solids from the succeeding stage to the preceding stage.

While I have referred to the concurrent flow of solids and gases from one stage to a succeeding one, it is clear that the solids and gases do not progress through the stages at the same velocity because of the slippage or "hindered settling" of the solid particles within the fluidized mass of each stage. As a matter of fact, the residence time of the solids in each stage will usually be very much greater than that of the gases therein. It is well to note that the residence time of the solids in each stage may be taken as a guide in effecting the desired conversion to zinc in each stage. Thus, if approximately the same conversion to zinc is desired in each of two stages in series, the residence times of the solids in the two stages should be the same. In turn, the residence time of the solids is related to the volume of the fluidized mass so that it may be said that the same conversion to zinc in two succeeding stages may be achieved by making the volumes of the fluidized solids in the two stages approximately equal.

Those skilled in the art will visualize many variations of the invention without departing from its spirit or intent. For instance, fire-tubes 27 of the reactor of Figure 1 may be bowed to get more heat exchange surface in contact with the fluidized mass. Also, the reducible compounds of other metals such as cadmium, usually occurring in small proportions with the zinc compounds, may be simultaneously reduced and their metal vapors recovered along with the zinc vapor. Accordingly, the foregoing disclosure should be interpreted as being illustrative of the invention and not restrictive; only such limitations should be imposed as are indicated in the appended claims.

What I claim is:

1. In the reduction of a solid inorganic oxygen-containing compound of zinc by a solid carbonaceous reducing agent, both said solids being in comminuted form, under fluidizing conditions for the recovery of zinc, the improvement which comprises conducting said reduction in at least two stages, and maintaining concurrent movement of the gases and solid particles of the fluidized mass from the first stage successively to the subsequent stages while preventing substantially all back-flow of said solid particles from any stage to preceding stages.

2. In the reduction of a solid inorganic oxygen-containing compound of zinc by a solid carbonaceous reducing agent, both said solids being in comminuted form, under fluidizing conditions for the recovery of zinc, the improvement which comprises conducting said reduction in at least two stages, at least the lower part of the fluidized mass in the first of said stages having a smaller horizontal cross-section than the smallest horizontal cross-section in any subsequent stage, and maintaining concurrent movement of the gases and solid particles of the fluidized mass from the first stage successively to the subsequent stages while preventing substantially all back-flow of said solid particles from any stage to preceding stages.

3. The process of claim 2 wherein the conversion to zinc effected with the solids entering each stage is approximately constant for all stages of said process.

4. The stagewise process of reducing a solid inorganic oxygen-containing compound of zinc by a solid carbonaceous reducing agent, both said solids being in comminuted form, under fluidizing conditions with the evolution of zinc vapor, which comprises introducing such comminuted zinc compound and such comminuted reducing agent into the fluidized mass of the first reducing stage, at least the lower part of the fluidized mass of said first stage having a smaller horizontal cross-section than the smallest horizontal cross-section in any succeeding stage, injecting a fluidizing medium into the bottom of said first stage, passing gases and solids from said first stage into the fluidized mass of at least one succeeding stage while preventing substantially all back-flow of said solids from any stage to preceding stages, and controlling the total depth of the fluidized mass in the several stages and the amount of fluidizing medium introduced into the first stage so that the gases leaving the last stage contain at least about 40% by volume of zinc vapor, based on only said fluidizing medium and the reaction gases deriving from the pure zinc oxide equivalent content of said zinc compound.

5. A two-stage process of reducing a comminuted solid material containing zinc oxide for the recovery of zinc, which comprises introducing said comminuted material and a comminuted solid carbonaceous reducing agent into the first reducing stage containing a fluidized mass of increasing horizontal cross-section in the upward direction, injecting a fluidizing medium into the bottom of said first stage, passing gasses and solids from said first stage into the second reducing stage containing a fluidized mass while preventing substantially all back-flow of said solids from said second stage to said first stage, and withdrawing gases and solids from said second stage, the withdrawn gases containing at least about 40% by volume of zinc vapor, based on only said fluidizing medium and the reaction gases deriving from the pure zinc oxide equivalent content of said comminuted material.

6. The process of claim 5 wherein the depth of the fluidized mass of the first stage is of the order of 10 to 40 feet.

7. A three-stage process of reducing a comminuted solid material containing zinc oxide for the recovery of zinc, which comprises introducing said comminuted material and a comminuted solid carbonaceous reducing agent into the first reducing stage containing a fluidized mass of increasing horizontal cross-section in the upward direction, injecting a fluidizing medium into the bottom of said first stage, passing gases and solids from said first stage into the second reducing stage containing a fluidized mass and passing gases and solids from said second stage into the third reducing stage containing a fluidized mass while preventing substantially all back-flow of said solids from any stage to preceding stages, effecting approximately the same conversion to zinc with the solids entering each of said three stages, and withdrawing from said third stage solids and gases containing at least about 40% by volume of zinc vapor, based on only said fluidizing medium and the reaction gases deriving from the pure zinc oxide equivalent content of said comminuted material.

8. The process of claim 1 wherein the conversion to zinc effected with the solids entering each of said three stages is approximately 75%.

9. In the reduction of a solid inorganic oxygen-containing compound of zinc by a solid carbonaceous reducing agent, both said solids being in comminuted form, under fluidizing conditions for the recovery of zinc, the improvement which comprises maintaining the comminuted mass undergoing reduction as a first bed of increasing horizontal cross-section in the upward direction, introducing such comminuted zinc compound and such comminuted solid reducing agent into said first bed to cause partial reduction of said zinc compound, charging a fluidizing medium at the bottom of said first bed to support fluidization therein, introducing the partially reacted solids into a second bed separated from said first bed but connected thereto for substantially only unidirectional flow of solids and gases from said first bed to said second bed, said second bed being maintained with a horizontal cross-section at least as large as the uppermost horizontal cross-section of said first bed, effecting further reduction of said zinc compound in said second bed, withdrawing from said second bed a gaseous effluent having a volume at least 8 times the volume of said fluidizing medium charged at the bottom of said first bed, and recovering zinc vapor from the gaseous effluent from said second bed.

10. An improved reactor for effecting the stagewise reduction of a finely divided inorganic, oxygen-containing compound of zinc under fluidizing conditions at an elevated temperature above the boiling temperature of zinc, which comprises two spaced, flat, vertical walls and two spaced, nonplanar, upright walls, said four walls forming a tall vessel having a substantially rectangular, horizontal cross-section which increases in area in the upward direction through said vessel, an inlet duct connected to the bottom of said vessel, an outlet duct connected to the top of said vessel, a plurality of spaced heating tubes passing horizontally through said vessel and said two flat walls and being connected to said two flat walls, and means extending substantially horizontally across said vessel to provide superimposed reduction stages in said vessel.

11. The reactor of claim 10 wherein the two spaced, nonplanar, upright walls are symmetrically curved toward the center of said reactor.

JOHN C. KALBACH.

REFERENCES CITED

The following references are of record in the file of this patent:

UNITED STATES PATENTS

| Number | Name | Date |
| --- | --- | --- |
| 2,371,619 | Hartley | Mar. 20, 1945 |
| 2,379,408 | Arveson | July 3, 1945 |
| 2,379,711 | Hemminger | July 3, 1945 |
| 2,393,704 | Ogorzaly | Jan. 29, 1946 |
| 2,397,352 | Hemminger | Mar. 26, 1946 |
| 2,398,443 | Munday | Apr. 16, 1946 |
| 2,416,730 | Arveson | Mar. 4, 1947 |
| 2,431,630 | Arveson | Nov. 25, 1947 |
| 2,425,098 | Kassel | Aug. 5, 1947 |
| 2,445,327 | Keith | July 20, 1948 |

FOREIGN PATENTS

| Number | Country | Date |
| --- | --- | --- |
| 587,774 | Great Britain | May 6, 1947 |